United States Patent [19]

Karman

[11] 4,273,658
[45] Jun. 16, 1981

[54] THICKENER CONTROL PROCESS
[75] Inventor: James S. Karman, Evansville, Wyo.
[73] Assignee: Exxon Production Research Company, Houston, Tex.
[21] Appl. No.: 78,973
[22] Filed: Sep. 25, 1979

Related U.S. Application Data

[63] Continuation of Ser. No. 843,471, Oct. 19, 1977, abandoned.

[51] Int. Cl.³ ............................................... C02F 1/52
[52] U.S. Cl. .................................... 210/709; 210/740
[58] Field of Search ..................... 210/42 R, 96.1, 49, 210/44, 86

[56] References Cited

U.S. PATENT DOCUMENTS

| | | | |
|---|---|---|---|
| 2,338,667 | 1/1944 | Riche | 210/96.1 |
| 3,128,786 | 4/1964 | Badgett | 210/96.1 |
| 3,281,594 | 10/1966 | Garrison | 210/96.1 |
| 3,287,263 | 11/1966 | Johnson et al. | 210/96.1 |
| 3,834,529 | 9/1974 | Hart | 210/96.1 |
| 4,040,954 | 8/1977 | Chandler | 210/96.1 |
| 4,159,248 | 6/1979 | Taylor et al. | 210/96.1 |
| 4,160,734 | 7/1979 | Taylor et al. | 210/96.1 |

FOREIGN PATENT DOCUMENTS 431890  7/1975  U.S.S.R. .................................. 210/96.1

OTHER PUBLICATIONS

White, L., "Wyoming Uranium Miners Set Sights on Higher Production"; Eng. of Mining Journal; Dec. 1975, pp. 61-71.

Primary Examiner—Benoit Castel
Attorney, Agent, or Firm—David A. Roth

[57] ABSTRACT

The operation of a continuous thickener, clarifier, or similar device having a feed well into which a feed slurry of suspended solids and a flocculant are continually introduced to effect separation of the slurry into a clarified solution which is withdrawn through an overflow launder and a thickened sludge which is transported into a discharge port at the bottom of the unit is controlled by establishing the slime level at a point near the bottom of the feed well, continuously monitoring the density of the downflowing slurry within the well, and regulating the rate of flocculant addition in response to small changes in the slurry density.

12 Claims, 1 Drawing Figure

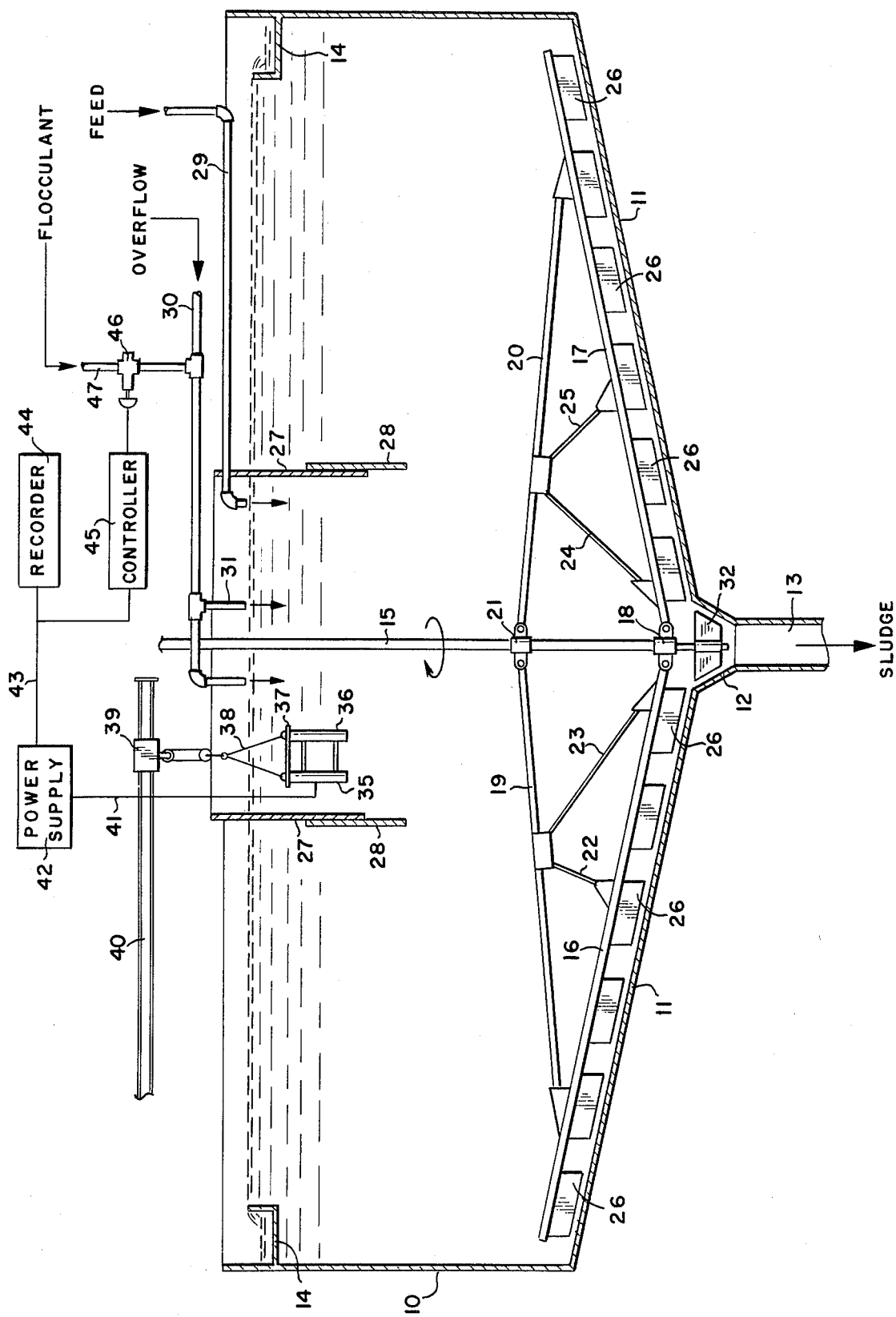

THICKENER CONTROL PROCESS

This is a continuation, of application Ser. No. 843,471, filed Oct. 19, 1977, now abandoned.

BACKGROUND OF THE INVENTION

1. Field of the Invention

This invention relates to continuous thickeners, clarifiers and similar gravitational settling devices for separating feed slurries or pulps into clarified liquid and sludge and is particularly concerned with a method for controlling the operation of such devices to improve their efficiency.

2. Description of the Prior Art

Continuous thickeners, clarifiers and similar gravitational settling devices are widely used in the chemical and metallurgical industries for the removal of liquids from slurries, metallurgical pulps, sewage, and other liquid-solid suspensions. Such devices generally include a circular tank having a cylindrical center well which extends downwardly into the vessel and is open at the bottom. The incoming slurry or pulp passes through a feed pipe or launder into the upper part of this center well and is introduced into the surrounding liquid through the bottom of the well in a manner designed to create a minimum of turbulence. This makes it possible to contain the bulk of the solids near the center of the unit. On leaving the well, the liquid entering with the pulp or slurry tends to move outwardly in a radial direction and flow upwardly toward a peripheral overflow launder. The solids suspended in the slurry or pulp settle downwardly through the slow-moving liquid and accumulate on the bottom of the unit. These solids are compressed as they accumulate and are slowly moved toward a bottom sludge discharge opening by means of slowly revolving rakes suspended a short distance above the bottom. The rakes aid in compressing the sludge and reduce its liquid content to a greater extent than is normally achieved in batch sedimentation operations.

During the normal operation of a thickener, clarifier or similar continuous gravity sedimentation device of the type referred to above, a series of relatively well-defined, vertically-spaced zones exist within the unit. The uppermost of these zones comprises a layer of clear liquid or clarified solution from which most of the solids have settled out. Below this is an intermediate layer containing suspended solid particles which is generally referred to as the "floc" layer. The interface between the clear solution and the floc layer is normally referred to as the "slime level". At the bottom of the unit is a layer of settled sludge. Such a system is a dynamic one characterized by the movement of liquid and solid particles between these zones. The levels of the three zones may vary considerably, depending upon the feed stream, operating conditions and other variables. During startup of the unit and during periods in which significant changes in feed rate, feed composition or other variables take place, three distinct zones may not exist. To achieve maximum capacity with such a unit, it has generally been thought that the slime level should be maintained as close to the top of the unit as possible and that only a thin layer of clarified solution should be maintained above the floc layer.

It is conventional to add flocculants or coagulants to thickeners, clarifiers and similar devices to increase their capacities. These materials cause the suspended particles in the slurry or pulp to flocculate or agglomerate and thus settle more rapidly. The amount of flocculant or the like which is required at any particular moment depends in part upon the slurry or pulp feed rate, the solids content of the feed, the solids size range and distribution, the densities of the solid particles, and the temperature and other operating conditions. Under constant conditions, the amount of flocculant needed to achieve maximum capacity in a particular thickener, clarifier or the like can generally be determined by trial and error. In actual practice, however, the conditions may change rapidly due to variations in the amount and composition of the solids suspended in the feed stream and other variables over which the operator of the unit may have relatively little or no control. Frequent adjustment of the amount of flocculant or coagulant added to the system is necessary to compensate for these variations and maintain the desired capacity and degree of separation while at the same time keeping operating costs within acceptable bounds by eliminating overflocculation.

It is common practice to use the slime level within a thickener or clarifier as a measure of the unit's performance and to monitor this level as a means for determining the need for changes in the flocculant rate. In general, the higher the slime level, the more flocculant that is needed. This measurement of the slime level has generally been done manually by means of measuring sticks lowered into the vessel near the outer edge of the unit. It has also been proposed that floats, differential pressure cells, or radiation detectors be positioned in the outer part of the tank to locate the step discontinuity in density representing the slime level and that changes in this level be used to control the addition of flocculant to the system. The slime level is not a direct measure of the settling characteristics of the solids in the pulp or slurry, however, and instead is the effect of a combination of variables, including flocculant rate, solids feed rate, solids and liquid characteristics, and the like. There is normally a long time lag between changes in the flocculant rate and corresponding changes in the slime level and hence the operator must estimate the amount of change in the flocculant rate which will be needed to produce a desired change in slime level. If he overestimates or underestimates the change in rate required, the unit may become unstable and eventually have to be shut down to avoid overloading or the carryover of slimes. The slime level therefore provides at best a visible means for assessing the state of the thickener or clarifier operation and, if it increases progressively, may serve as an advance warning that the capacity of the thickener or clarifier has been exceeded. It is virtually useless as a means for controlling the rate of flocculant addition.

Recognition that earlier methods for controlling thickener operation by regulating the rate of flocculant addition are ineffective has led to a suggestion that the incoming feed slurry or pulp in the feed launder be sampled at regular intervals downstream of the point of flocculant addition, that each sample thus collected be passed into a special gravity separation vessel where representative settling can take place, and that the separated liquid and solids phases be separately withdrawn from this special separation vessel in a volume ratio determined by the conditions desired in the thickener or clarifier. By sensing the interface level between the liquid and solids phases in the separation vessel and adjusting the rate of flocculant or coagulant addition to the feed stream in accordance with variations in the level of the interface during operation of the system, it has been said that the rate of flocculant addition can be controlled automatically and that the flocculant consumption can be reduced substantially. Experience has demonstrated, however, that the system thus proposed is not effective. Its use has therefore been abandoned. Efforts to develop other, more reliable methods for the automatic control of flocculant or coagulant addition in order to stabilize the operation of thickeners and clarifiers and reduce chemical consumption have in the past been largely unsuccessful.

SUMMARY OF THE INVENTION

The present invention provides an improved method for controlling a thickener, clarifier or similar gravitational settling device by regulating the rate of flocculant or coagulant addition which largely avoids the difficulties outlined above. The method of the invention results in more stable thickener or clarifier operation and makes it possible to achieve higher sludge densities, lower clarified solution solids contents, decreased flocculant or coagulant consumption, increased slurry or pulp capacity, and reduced unit downtime. The overall effect of this is a significant reduction in the cost of thickening or clarification per unit volume of slurry or pulp handled.

In accordance with the invention, it has now been found that the operation of a thickener, clarifier or similar device having a feed well through which the incoming slurry or pulp and a flocculant or coagulant are introduced into the unit can be effectively controlled by establishing the slime level within a predetermined distance of the bottom of the feed well, monitoring very small changes in the density of the slurry or pulp as it moves downwardly within the well, and adjusting the rate at which the flocculant or coagulant is added in response to these small changes in density. The invention is based in part upon the discovery that the position of the slime level with reference to the bottom of the center well has a pronounced effect upon the settling rate within the well and that a suitable slime level is a critical factor if effective control is to be established and maintained. Once the proper slime level has been obtained, changes in the density of the downflowing slurry or pulp provide a direct measure of the effect of flocculant or coagulant addition upon particle settling velocities. The monitoring of such changes makes possible the stabilization of thickener or clarifier operations and permits optimization in terms of reagent consumption, sludge density, clarified solution solids content, slurry or pulp volume, and unit downtime, despite substantial fluctuations in the feed rate to the unit, variations in the characteristics of the ore or other solids being handled, and changes in the amount of solids present in the incoming slurry or metallurgical pulp.

As indicated above, it has been found that the position of the slime level with reference to the bottom of the feed well has a marked effect upon the settling rate within the well. If the level becomes too high, the slimes concentration in the well will increase until a point is reached at which effective control of the unit can no longer be maintained. Similarly, if the level becomes too low, the well will become depleted of slimes and control will again be lost. The zone within which the slime level must be maintained depends in part upon the configuration and dimensions of the particular thickener, clarifier or similar device and will vary somewhat from one unit to another. In general, however, it has been found that the slime level should normally be established and maintained within a zone extending from about 18 inches above the bottom of the feed well to about 18 inches below the bottom of the well. The optimum position in a particular thickener or the like can readily be determined experimentally by varying the slime level while adding flocculant in response to changes in slurry density within the feed well and observing the effect of such variations on control of the unit. Further changes in slime level will normally occur, although in some cases slowly, if the initial level is too far above or below the bottom of the well.

The slime level in a thickener or similar device can be adjusted to the required level by changing the flow rates to and from the device. An increase in the rate at which slurry is supplied to such a unit and a corresponding increase in the rate at which clarified solution is withdrawn, assuming there is no change in settling rate, will normally result in an increase in the slime level; while a reduction in rates will have the opposite effect. By varying the rates in this manner, the level needed to permit effective control in accordance with the invention can normally be established without difficulty.

The method of the invention requires the measuring of the density of the downflowing pulp or slurry at two or more points or over an interval within the feed well of the thickener or similar device. The density value near the top of the feed well will normally be less than near the bottom of the well. As the pulp or slurry moves downwardly within the well, the density will increase with flocculation. The variations in density which thus take place will depend in part upon the particular liquid-solids system being handled, the degree of flocculation which occurs, and other factors. Although these variations are normally small, they can be readily detected. In a typical thickener operation handling a metallurgical pulp containing mineral solids, for example, the density of the incoming pulp in the upper portion of the feed well may average about 1.043 grams per cubic centimeter; while that of the heavily flocculated pulp in the lower part of the well may average about 1.081 grams per cubic centimeter. In this particular instance, the density span is thus about 0.04 gram per cubic centimeter. These values illustrate the variation which may occur due to flocculation but should not be taken as limiting. The difference in density values due to flocculation may be greater or less than this, depending upon the particular liquid-solids system being handled, the solid particle sizes, and the like. For most applications of the invention, it is preferred to employ a system sufficiently sensitive to detect changes in density of about 0.005 gram per cubic centimeter or smaller within the range between about 1.0 and about 1.200 grams per cubic centimeter.

Any of a variety of different instruments having the required sensitivity may be employed for the detection of density changes in carrying out the invention. Suitable instruments include optical devices based upon changes in light transmissibility of the pulp or slurry such as submerged turbidimeters, sonic devices responsive to changes in sound transmissibility which accompany changes in pulp density, and radioactive systems which detect variations in the passage of energy from a radioactive source to a detector with variations in pulp density. As pointed out earlier, the system employed should be capable of detecting density changes which take place over a vertical interval within the feed well and hence the system selected will normally include either multiple sources or multiple detectors or both or will utilize an elongated or collimated source or detector or both such that the value obtained represents changes in density over such a vertical interval. In general, it is preferred to employ a radioactive source and detector system having a strip source of gamma ray radiation several inches long. Such radioactive source detector systems are available from commercial sources and will be familiar to those skilled in the art. Suitable optical and sonic devices which may be employed for purposes of the invention are also commercially available.

The density measuring instrument employed for purposes of the invention will normally be suspended in the feed well of the thickener or clarifier below the pulp or slurry surface and will be supported on an adjustable carriage above the well so that the position of the device can be varied within the well. The output signal from this device is passed through an electrical conductor to a power supply unit where the signal is amplified and used to provide a corresponding voltage which can be recorded and employed to drive a controller connected to an electrically or hydraulically operated valve in the supply line through which flocculant is introduced into the well. It is generally preferred to introduce this flocculant into a line through which water is supplied or clarified liquid is returned to the well to increase the efficiency of flocculation within the thickener or clarifier. This aids in securing proper distribution of the flocculant in the well. The submerged instrument detects changes in density representing variations in the settling rates of the solids in the pulp or feed slurry and emits an electrical signal which results in an instantaneous adjustment of the flocculant rate to counteract the changes in settling rate. Changes in density representing a reduction in settling rate produce an increase in flocculant addition sufficient to offset and compensate for the reduction. Changes indicating an increase in settling rate, on the other hand, result in a decrease in flocculant addition sufficient to offset and compensate for the increase. The result is better control of the unit and much more uniform operation than could otherwise be obtained.

Experience has shown that this system provides precise control of flocculant addition, enables the unit to respond to extreme changes in pulp or slurry volume and composition, permits the maintenance of a substantially constant slime level within the thickener or clarifier, results in increased thickener underflow densities, substantially reduces thickener downtime, and has numerous other advantages. These and other advantages of the system will become more readily apparent from the detailed description of the preferred embodiments of the invention set forth below.

BRIEF DESCRIPTION OF THE DRAWING

The drawing is a schematic representation of a vertical section through a rotary thickener provided with a flocculant addition control system constructed in accordance with the invention.

BRIEF DESCRIPTION OF THE PREFERRED EMBODIMENTS

The drawing illustrates a continuous rotary thickener including a cylindrical tank of steel, concrete or wood having a bottom 11 which slopes downwardly from the tank periphery to a sludge discharge opening at the center of the bottom. The discharge opening includes a sludge cone 12 through which sludge produced in the unit moves into discharge line 13. Overflow launder 14 is provided at the upper periphery of the tank for the withdrawal of clarified liquid from the unit. A revolving rake assembly including a central shaft 15 driven by a motor and gear assembly not shown in the drawing is provided at the center of the tank. Supported on shaft 15 is a rake assembly including rake arms 16 and 17 which are attached to the shaft by means of spider 18. Tie rods 19 and 20 connected to the shaft by tie rod spider 21 support the rake arms. Braces 22, 23, 24 and 25 are provided to strengthen the rake assembly. Blades 26 are mounted on the lower part of the rake arms and are set at an angle to the arms so that sludge accumulating on the bottom of the tank is pushed toward the discharge opening as the rake assembly revolves in the tank. In lieu of a sloping bottom as shown, the unit may be provided with a flat bottom, in which case solids will accumulate to form a sloping configuration similar to that shown.

The upper part of tank 10 is provided with a feed well 27 supported by structural members which do not appear in the drawing. This feed well is a cylindrical member which is open at the top and bottom and has a diameter of from about 10 to about 30% of the tank diameter. The upper end of the feed well may or may not extend above the inner edge of overflow launder 14 and thus be higher than the liquid level in the tank. At its lower end, the feed well may be provided with an adjustable skirt or shroud 28 which permits the length of the well to be increased or decreased as desired. The skirt is attached to the outer part of the feed well by means of clamps or other devices not shown in the drawing. The feed pulp or slurry is introduced into the unit through feed launder or pipe 29 which discharges into the upper part of the well. An overflow line 30 with one or more outlets 31 in the upper part of the feed well is provided for the introduction of water or the return of clear solution to the unit. The device shown will normally have a center scrapper 32 located at the lower end of shaft 15 and a mechanism, not shown in the drawing, for raising the shaft to lift the rake assembly above the bottom to prevent overloading of the unit.

The apparatus employed for purposes of the invention has been described up to this point in terms of a specific type of thickener but it will be understood that the invention is not restricted to this particular apparatus. It may be employed with a variety of other thickeners, clarifiers, and similar gravity sedimentation devices provided with revolving rake assemblies, including torque thickeners, tray thickeners, traction thickeners, upflow or siphon feed thickeners and clarifiers, and the like. It can also be utilized in conjunction with horizontal, rather than rotary, thickeners, clarifiers and similar devices. Such devices have been described at length in the technical literature and will therefore be familiar to those skilled in the art.

The instrument for detecting density changes in the system shown in the drawing may be an optical or sonic source-detector unit but will preferably comprise a radioactive source and detector unit provided with a 30-inch active length collimated strip source assembly 35 and a temperature-controlled detector cell 36 of equivalent active length, both mounted in rubber-covered waterproof housings. A 100 millicurie cesium-137 strip source or other equivalent radioactive source available from commercial suppliers may be employed. Similarly, the detector cell may be of conventional design. The length of the sensor should normally be approximately the same as the length of the center well. For maximum sensitivity, the sensor should be as long as possible but in general should not extend above or below the center well. The source and detector units are mounted on an adjustable frame 37 which permits variation of the horizontal distance between the units from about 6 to about 24 inches. The frame is supported by means of a cable 38 or similar member and suspended from an overhead traveling crane or the like 39 on rail 40 to permit variation of the horizontal and vertical position of the assembly within the feed well of the thickener.

The source-detector assembly is connected by cable 41 to a conventional power supply unit 42 of commercial design which converts the signal from the detector into a voltage which is transmitted through cable 43 to an electrical recorder 44 and an electrical controller 45. The output signal from the controller is used to actuate automatic valve 46 in flocculant supply line 47 so that the amount of flocculant supplied is increased in response to a decrease in settling rate and reduced in response to an increase in settling rate. The valve selected may be electrically or hydraulically actuated and hence the controller employed will depend in part upon the particular type of valve used. Any of a variety of commercially available power supply units, recorders, controllers, and valves compatible with one another may be employed. Such equipment will be familiar to those skilled in the instrumentation art. The flocculant supply line 47 downstream of valve 46 is connected into overflow line 30 so that the flocculant solution can be injected with the water or clear solution introduced into the feed well through line 30. The diluted flocculant concentration will generally be in the range between about 0.002 and about 0.2% by volume. The flocculant rate will depend upon the size of the unit, the material being handled, and other factors but in a typical installation may range between about 100 and about 200 gallons per minute. A venturi-type injector not shown in the drawing will preferably be used for introduction of the flocculant solution into line 30.

In utilizing the system of the invention, the apparatus must be carefully calibrated to insure the required sensitivity over the requisite range of operating conditions. To permit proper calibration, the horizontal space or gap between the source and detector in the sensor should be variable, the vertical position of the sensor within the center well should be capable of adjustment, the sensor should be of sufficient length to make density differences between the top and bottom of the sensor readily detectable, the detector should be equipped with a set of variable resistors which permit ultrasensitive adjustment for the zero and calibration readings, and a test calibration unit for determining suppression and range resister selection may be used. A suitable test unit can be readily prepared by mounting a plurality of parallel resistors having different resistance values on a suitable chassis so that individual suppression and range resistance values can be varied until the desired readings are obtained.

Prior to calibration of the system, the flow rates to and from the thickener should be adjusted to position the slime level near the bottom of the center well. As pointed out earlier, there is a critical zone within which the slime level should be located to permit effective control in accordance with the invention. In general, this zone will extend about eighteen inches above and below the bottom of the feed well or, if a skirt or shroud 28 is used, the bottom of the skirt or shroud. If the slime level is more than about eighteen inches above the bottom of the well, the concentration of solids in the center well may become too high to permit adequate control of the unit by monitoring changes in density within the center well. Similarly, if the slime level is more than about eighteen inches below the bottom of the well, the solids concentration within the well may be too low to permit adequate control through the measurement of density changes. The use of an adjustable skirt or shroud as shown permits variation of the length of the center well and may in some cases facilitate operations under adverse or difficult conditions. It is generally preferred that the slime level be located as near the bottom of the well as possible. During calibration, changes in the composition of the feed stream entering the thickener, the feed rate, and other operating variables should be avoided. At a constant settling rate, the slime level normally tends to remain substantially constant.

Once the slime level has been established at the proper position with reference to the bottom of the feed well, the control system of the invention is calibrated by first adjusting the vertical and horizontal position of the source-detector unit within the center well until an on-scale reading is obtained on the recorder 44. Experience has shown that there are certain areas within the center well where the settling rate and density changes are proportional and that in other areas this may not always be the case. By moving the source-detector unit within the well until a constant density reading is obtained on the recorder, under constant thickener operating conditions, the optimum position for the source-detector can normally be found without difficulty. In some cases, however, it may be found that the recorder is initially off scale at all source-detector unit locations within the center well. If this is the case, it will be necessary to adjust the output of the detector 36 until an on-scale signal is obtained. This can normally be done by changing the internal resistance of the detector unit to obtain greater or reduced amplification of the signal from the detector. After an on-scale reading is obtained, the power supply and controller calibration circuitry can be adjusted to center the recorder reading obtained. Thereafter, the amount of flocculant fed to the thickener can be altered to vary the settling rate within the center well. As pointed out previously, the density reading obtained is proportional to the settling rate. Commercially available density measuring equipment using radioactive sensors and detectors or the like is normally intended for applications requiring considerably less sensitivity than is needed for purposes of this invention and hence it will generally be necessary to change the suppression and feedback resistors in the amplification section of the system and make other adjustments to obtain a significant range of recorder values with changes in the amount of flocculant added. Once the required degree of sensitivity has been secured, the controller 45 can be adjusted to regulate the operation of valve 46 so that the quantity of flocculant needed to control the settling rate and maintain a constant slime level is added with the overflow liquid supplied through line 30. This calibration of the system may require continued adjustment of the apparatus by trial and error over a considerable period of time until the proper response to changes in feed rate, feed composition and other operating variables is obtained. The precise calibration technique employed will depend to a large extent upon the particular density measuring system, recorder, controller and valve used and may be varied as necessary.

Once the system of the invention has been properly calibrated as described above, the system will automatically regulate the flocculant addition rate to maintain the slime level within the thickener relatively constant. Any variation in settling rate within the center well due to a change in feed rate, feed composition, solids particle size or density, slurry temperature or the like which would normally produce a change in the settling rate and an alteration in the slime level will be compensated for and offset by a corresponding change in the flocculant addition rate. This makes it possible to obtain higher sludge densities, lower clarified solution solids contents, decreased flocculant consumption, increased slurry capacity, substantially constant slime levels, and reduced unit downtime. The overall effect of this is a substantial improvement in thickener operation and a reduction in thickening cost.

The advantages of the system of the invention are illustrated by the results obtained in a multiunit thickening system used for the separation of solids from a slurry of spent uranium ore particles following the extraction of uranium values with sulfuric acid. This particular installation included a series of rotary thickeners similar to that shown in the drawing. Each thickener was equipped with a variable gap source-detector unit including an Ohmart Corporation SHRM-30 source holder containing a thirty-inch strip source of 100 millicurie cesium 137, an Ohmart Corporation thirty-inch strip source-detector Model LJ30-W/FA with an FA amplifier, and an Ohmart Corporation EDS-1 power supply unit having an output of from 0 to −50 millivolts or from 0 to −10 volts, and from 4 to 20 milliamps. The source and detector were enclosed in special rubber-covered housings and connected by an adjustable frame so that the space between them could be varied from 6 to 20 inches. This unit was supported in the center well of the thickener by a system which permitted adjustment of the horizontal and vertical position within the well. The suppression and feedback resistors in the amplifier section of the detector system were replaced during calibration to secure proper density readings. The recorder controller unit employed was a Westinghouse recorder-controller Model 75RC2110/203-111/111 with proportional plus reset control modes.

The effect of the system of the invention upon flocculant consumption is shown in the table by a comparison of the consumption over a 31-day period in which the operation was controlled manually, during a similar period in which the operation was controlled in accordance with the invention, and during a later period in which the method of the invention was used. It will be noted from the data set forth in the table that the amount of flocculant required per ton of ore processed during manual operation was relatively high, about one-half pound per ton, and that the use of the system of the invention permitted a substantial reduction in flocculant consumption, in excess of 30%. The figures shown in the table take into consideration variations in the slime content of the ore being processed and are thus comparable. The reduction in flocculant consumption thus achieved represents a substantial saving in operating costs.

TABLE

| | Flocculant Consumption | | | | | | | | |
|---|---|---|---|---|---|---|---|---|---|
| | Manual Operation | | | Controlled Operation | | | Controlled Operation | | |
| Days | Tons/Day | % Solids <325 Mesh | Floc., Lbs. | Tons/Day | % Solids <325 Mesh | Floc., Lbs. | Tons/Day | % Solids <325 Mesh | Floc., Lbs. |
| 1 | 3372 | 26.5 | | 3405 | 29.6 | | 3492 | 26.3 | |
| 2 | 2784 | 23.1 | | 3276 | 23.8 | | 3182 | 23.5 | |
| 3 | 3430 | 27.0 | 5728 | 3113 | 23.7 | | 3247 | 24.1 | |
| 4 | 2975 | 25.1 | | 3058 | 28.7 | | 3336 | 26.3 | |
| 5 | 3241 | 27.3 | | 3270 | 26.4 | | 2592 | 21.5 | |
| 6 | 1096 | 22.8 | | 3453 | 26.0 | | 3398 | 19.8 | |
| 7 | 3533 | 20.8 | | 3488 | 26.8 | | 3417 | 18.7 | |
| 8 | 2733 | 20.8 | | 2949 | 24.8 | | 3724 | 21.5 | |
| 9 | 3197 | 21.9 | | 3294 | 25.5 | | 3352 | 24.2 | |
| 10 | 3379 | 21.3 | 10557 | 3183 | 27.1 | | 3386 | 20.8 | |
| 11 | 3567 | 26.1 | | 3039 | 22.2 | | 3409 | 25.2 | |
| 12 | 3238 | 20.0 | | 3170 | 23.5 | | 3401 | 28.4 | |
| 13 | 3345 | 18.5 | | 3089 | 21.2 | | 3428 | 24.6 | |
| 14 | 3244 | 26.3 | | 3224 | 21.8 | | 3117 | 22.1 | |
| 15 | 3205 | 29.5 | | 3554 | 23.0 | | 2759 | 43.2 | |
| 16 | 3091 | 27.3 | | 3390 | 28.9 | | 2738 | 35.6 | |
| 17 | 3100 | 31.4 | 9243 | 3154 | 26.7 | | 2664 | 36.4 | |
| 18 | 3230 | 28.4 | | 3260 | 23.0 | | 2993 | 33.1 | |
| 19 | 3146 | 23.6 | | 3497 | 27.4 | | 2972 | 26.6 | |
| 20 | 3337 | 23.2 | | 3477 | 25.9 | | 3238 | 29.9 | |
| 21 | 3144 | 28.5 | | 3520 | 24.4 | | 3282 | 25.3 | |
| 22 | 3251 | 26.4 | | 3302 | 21.9 | | 3143 | 22.0 | |
| 23 | 3023 | 35.4 | | 3237 | 25.4 | | 3255 | 21.9 | |
| 24 | 3287 | 20.9 | 10228 | 3267 | 24.4 | | 3103 | 20.0 | |
| 25 | 2761 | 24.1 | | 3014 | 22.4 | | 2618 | 23.9 | |
| 26 | 3004 | 28.2 | | 1067 | 21.9 | | 3453 | 24.8 | |
| 27 | 3014 | 21.4 | | 2371 | 23.1 | | 3317 | 22.3 | |
| 28 | 3344 | 20.0 | | 2908 | 22.1 | | 2869 | 23.6 | |
| 29 | 3357 | 19.3 | | 3000 | 25.4 | | 2396 | 23.9 | |
| 30 | 3456 | 15.9 | | 2916 | 26.9 | | 1585 | 24.7 | |
| 31 | 3224 | 25.1 | 11875 | | | | 2559 | 28.8 | |
| Totals | 97108 | 756.10 | 47631 | 93945 | 743.90 | 36822 | 95425 | 793.0 | 30625 |

TABLE-continued

| | Manual Operation | | | Flocculant Consumption Controlled Operation | | | Controlled Operation | | |
|---|---|---|---|---|---|---|---|---|---|
| Days | Tons/Day | % Solids <325 Mesh | Floc., Lbs. | Tons/Day | % Solids <325 Mesh | Floc., Lbs. | Tons/Day | % Solids <325 Mesh | Floc., Lbs. |
| Averages | 3132.516 | 24.39 | .4904#/Ton | 3131.50 | 24.796 | .3919#/Ton | 3078.225 | 25.58 | .3209#/Ton |

Note:
% Solids <325 Mesh indicates slime content of ore. An increased slime content normally results in increased flocculant consumption. The system of the invention has resulted in a decrease of from 30 to 35% in the amount of flocculant required per ton of ore processed, based on comparative slime content averages.

The advantages of the system of the invention are further illustrated by the variations in slime level before and after installation of the system. With manual regulation of the amount of flocculant added, slime level variations of as much as + or −16 inches were incurred. Following installation of the system of the invention, slime level variations were routinely held to about plus or minus 2 to 4 inches. Similarly, thickener downtime following installation of the system was reduced from an average of about 7 to 8 hours per month to an average of about one hour per month or less, a significant reduction. The average density of the underflow sludge from the system also increased as the result of use of the system of the invention. It will be apparent that these improvements in thickener operation significantly reduce operating costs and increase thickener efficiency.

Although the invention has been discussed above primarily in terms of the treatment of metallurgical pulps and similar slurries, it should be recognized that it is not limited to such applications and can also be utilized in sewage disposal plants, chemical plants, and a variety of other facilities requiring the use of thickeners and similar continuous gravity sedimentation devices for the separation of a liquid suspension of solid particles into clarified liquid and sludge phases.

I claim:

1. A method for controlling the operation of a continuous gravity sedimentation unit having a feed well into which a slurry of suspended solids and a flocculating agent are introduced to effect separation of said slurry into a clarified solution that is recovered from said unit as an overflow liquid and a sludge that is withdrawn from the bottom of said unit whereby consumption of flocculating agent is reduced comprising the steps of establishing a slime level within a predetermined optimum distance from the bottom of said feed well by varying the flow rates to and from said unit, detecting changes in the density of the downflowing slurry over a vertical interval in said feed well, correlating said density changes in the solids settling rate within said well, and continuously varying the rate at which said flocculating agent is introduced into said feed well in response to said changes in density and whereby control of both settling rate and slime level is obtained.

2. A method as defined by claim 1 wherein said changes in density are detected by passing energy from a radioactive source to a detector located within said feed well.

3. A method as defined by claim 1 wherein said slime level is established at a point within about eighteen inches of the bottom of said feed well.

4. A method as defined by claim 1 wherein said changes in density are detected by means of a collimated radioactive source and detector.

5. A method as defined by claim 1 wherein changes in density of about 0.005 gram per cubic centimeter within the range between about 1.0 and about 1.200 are detected.

6. A method as defined by claim 1 wherein optical means are employed to detect said changes in density.

7. A method as defined by claim 1 wherein sonic means are employed to detect said changes in density.

8. A method according to claim 1 whereby multiple units in series are utilized.

9. A method for controlling the operation of a continuous rotary thickener having a center well into which a flocculant and a slurry of suspended solids are introduced to effect separation of the slurry into a clarified solution which is withdrawn from the thickener as overflow and a thickened sludge which is recovered from the bottom of the thickener comprising the steps of adjusting the flow rates to and from said thickener until a slime level within about eighteen inches of the bottom of said center well has been established, measuring the density of the downflowing liquid and suspended solids over a vertical interval within said center well with sufficent sensitivity to detect changes in density due to changes in the solids settling rate in said center well, and varying the rate at which said flocculant is introduced into said center well in response to said changes in density to compensate for said changes in said solids settling rate.

10. A method as defined by claim 9 wherein said density is measured by radioactive means.

11. A method as defined by claim 9 wherein said density is measured with sufficient sensitivity to detect density changes of about 0.005 gram per cubic centimeter within the range between about 1.0 and about 1.200 grams per cubic centimeter.

12. A method as defined by claim 9 wherein said density is measured by means of a collimated radioactive source and detector immersed in said downflowing liquid and suspended solids within said center well.

* * * * *